C. N. HARRINGTON.
EAR CORN HOLDER.
APPLICATION FILED MAR. 3, 1909.
952,616. Patented Mar. 22, 1910.
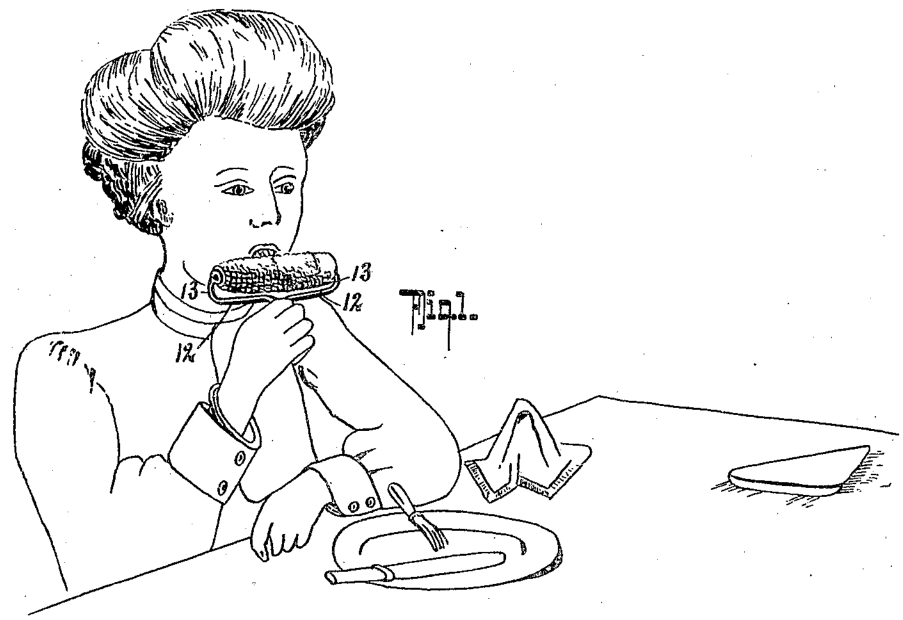
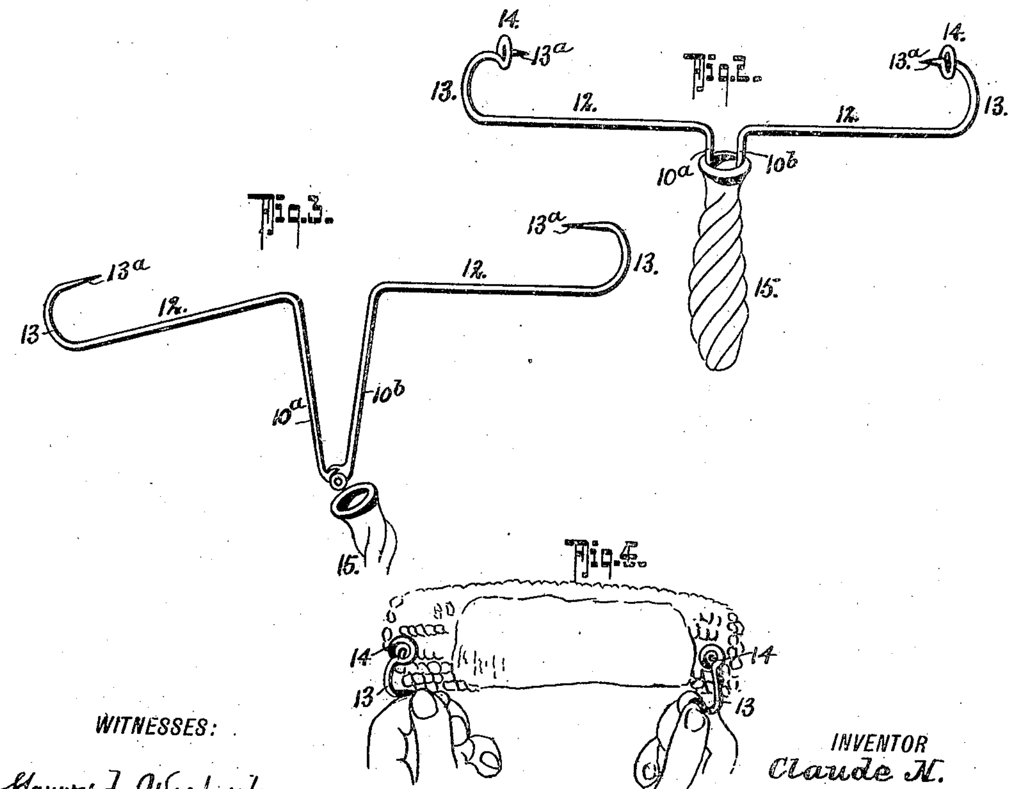
WITNESSES:
Hayward Woodard
Charles H. Wagner
INVENTOR
Claude N. Harrington
BY
Fred G. Dieterich & Co
ATTORNEYS
ANDREW B. GRAHAM CO., PHOTO-LITHOGRAPHERS, WASHINGTON, D. C.

UNITED STATES PATENT OFFICE.

CLAUDE N. HARRINGTON, OF AVON, MINNESOTA.

EAR-CORN HOLDER.

952,616. Specification of Letters Patent. Patented Mar. 22, 1910.

Application filed March 3, 1909. Serial No. 481,008.

*To all whom it may concern:*

Be it known that I, CLAUDE N. HARRINGTON, residing at Avon, in the county of Stearns and State of Minnesota, have invented a new and Improved Ear-Corn Holder, of which the following is a specification.

This invention has for its object to provide a simple, neat and inexpensive device for holding ears of sweet corn without burning or soiling the fingers while eating, and it comprehends the improved construction and arrangement of parts, hereinafter fully described, specifically pointed out in the appended claims and illustrated in the accompanying drawing, in which:—

Figure 1, illustrates the manner in which my holder is used. Fig. 2, is a view of the holder showing the preferred way of arranging the pronged ends. Fig. 3, is a similar view and shows plain penetrating or prong ends and the socket or handle member separated from the hinged members of the holder. Fig. 4, is a view that illustrates how my holder may be used for gripping both ends of the corn.

In the practical arrangement, my holder is made of two pieces of spring wire bent to like shapes, each being bent to a right angle to form a horizontal outwardly extending portion 12—12 and pendant members $10^a$ $10^b$, the said members $10^a$ $10^b$ forming, as it were, a loop-shaped tang or handle for being either readily directly grasped in the hand, or adapted to fit into a socketed handle 15 and to allow for freely spreading the two sections in opposite directions so their pronged ends may fit over different lengths of corn ears, the lower ends of the members $10^b$ being hinged to each other as best shown in Fig. 3.

In the preferred form of my holder, as in Fig. 2, the outer ends of parts 12 are bent back in a plane parallel with the members 12 to form the gripping fingers, and in the said preferred form the bent back ends are first bent and coiled transversely with respect to the members 12 whereby to form disks 14—14 and the extreme ends are pointed to form the sharpened prongs $13^a$ that extend inwardly from the coiled disks 14, said prongs $13^a$ serving to positively penetrate the ends of the corn ear, while the disks 14 hold the said ends from penetrating too far. The disks 14 may be dispensed with and the turned back portions 13 may end in straight prongs $13^a$, as clearly shown in Fig. 3.

In Fig. 4 I have illustrated how my improvement may be made of suitable size to engage the ear of corn by gripping the same transversely and use one holder for each hand and end of the ear.

The holder may be silvered, nickeled, bronzed or of spring metal and other forms than the special shape shown, may be made without departing from my invention or the scope of the appended claims.

Having thus described my invention, what I claim is:

1. An ear corn holder, formed of spring wire comprising two opposing sections hinged together, and bent at the hinged end to form a loop-like tang, then bent in opposite directions with their extremities bent backwardly upon themselves to form gripping members and then terminating in penetrating prongs, and socketed handle for fitting on the hinged tang, as set forth.

2. An ear corn holder, formed of spring wire, comprising two opposing sections hinged together, and bent at the hinged end to form a loop-like tang, then bent in opposite directions with their extremities bent backwardly upon themselves to form gripping members.

3. An ear corn holder, formed of spring wire, comprising two opposing sections hinged together, and bent at the hinged end to form a loop-like tang, then bent in opposite directions with their extremities bent backwardly, the free ends thereof being coiled transversely to form disks and then projected from the disks to form prongs, as set forth.

CLAUDE N. HARRINGTON.

Witnesses:
NIC J. HARREN,
ALEX BRANDTNER.